Patented Nov. 17, 1953

2,659,716

UNITED STATES PATENT OFFICE 2,659,716

VINYL HALIDE POLYMERIZATION WITH ADIPOYL PEROXIDE AND HEXAMETHYLENE DIAMINE

Harold F. Park, East Longmeadow, Mass., assignor to Monsanto Chemical Company, St. Louis, Mo., a corporation of Delaware No Drawing. Application October 24, 1952, Serial No. 316,788

5 Claims. (Cl. 260—92.8)

This invention relates to a process for the polymerization of vinyl halides. More particularly, the process relates to the polymerization of vinyl halides in the presence of a new catalyst.

One object of this invention is to provide solid moldable polymers of vinyl halides.

A further object of this invention is to provide a process for producing solid moldable polymers of vinyl halides.

Another object is to provide a new catalyst for the polymerization of vinyl halides.

These and other objects are attained by polymerizing oxygen-free vinyl halides in contact with a mixture of adipoyl peroxide and hexamethylene diamine.

The following examples are given in illustration and are not intended as limitations on the scope of this invention. Where parts are mentioned, they are parts by weight.

EXAMPLE

Vinyl chloride containing substantially no oxygen was compressed to 250 atmospheres in the presence of 0.1 part of a mixture of molecular equivalent amounts of adipoyl peroxide and hexamethylene diamine per 100 parts of vinyl chloride. The compressed mixture was forced through a steel reaction vessel heated to 300° C. The mixture passed through the reaction zone in about 90 minutes and it was then forced through a suitable pressure-reducing valve into a cool atmospheric pressure zone. More than 50% of the vinyl chloride was converted to polymer. The polymer was hard, transparent and easily molded.

It is essential that the vinyl halide used in the process of this invention be substantially oxygen-free. Amounts of oxygen as small as 0.06% by weight speedily poison the catalysts of this invention.

In place of the vinyl chloride used in the example, other vinyl halides or mixtures of one or more vinyl halides with one or more other copolymerizable ethylenically unsaturated compounds may be used. Thus, vinyl fluoride, vinyl bromide or vinyl iodide may be polymerized alone or in conjunction with vinylidene compounds such as vinylidene chloride, vinylidene fluoride, 1,1-chlorofluoroethylene; vinyl esters including vinyl acetate, vinyl butyrate, vinyl laurate, vinyl stearate, etc.; vinyl ethers including vinyl methyl ether, vinyl ethyl ether, vinyl octyl ether, etc.; acrylic acid, acrylonitrile, acrylic esters including methyl, ethyl, propyl, phenyl, etc. acrylates, acrylamide, alpha-substituted acrylic acids, nitriles, esters and amides such as methacrylic acid, methacrylonitrile, ethyl methacrylate, methacrylamide, methyl methacrylate, atroponitrile, etc.; the acids, esters and amides of alpha,beta-ethylenically unsaturated dicarboxylic acids such as the fumaric, maleic, citraconic, itaconic, etc. acids, their esters and amides, etc. If a copolymer is prepared by the process of this invention it should contain more than 50% by weight of vinyl halide.

The reaction conditions which may be used vary from 100° C. to 400° C. and from 25 to 500 atmospheres pressure. The particular conditions used in combination with the amount of catalyst determine the molecular weight and, consequently, the hardness and moldability of the polymer produced. In general, it may be said that a combination of 100° C., 500 atmospheres pressure and 0.01 part of catalyst will produce the highest molecular weight and the hardest polymer. In fact, such conditions may result in a polymer so high in molecular weight that it is not easily molded under conventional conditions, i. e. it is necessary to substantially raise pressures and temperatures used for molding or extrusion.

The amount of catalyst mixture used may vary between 0.01 part to 5 parts per 100 parts of monomer or monomer mixture. At the lower part of the range, polymerization is slow unless the higher temperature range is used, and the molecular weight of the polymer is relatively high. At from 3 to 5 parts, polymerization is quite rapid even at 100° C. and the product is so low in molecular weight that it approaches the lower limit of moldability. In order to obtain the most accurate control of the reaction rate and to produce an optimum range of moldable polymers, the amount of catalyst is preferably restricted to from 0.01 to 1.0 part per 100 parts of monomer or monomer mixture. The amounts of the components in the catalyst mixture should be equal on a molar equivalent basis.

The adipoyl peroxide, which may also be called adipyl peroxide, has the following formula:

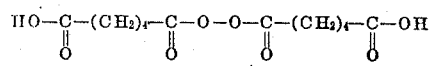

It may be prepared by reacting one mol of adipoyl chloride with 0.5 mol of sodium peroxide followed by hydrolysis of the unreacted acyl chlorine atoms. The reaction should be carried out in an aqueous medium at about 0° C. and care should be taken to avoid an excess of sodium peroxide.

This invention provides a simple process for preparing relatively high molecular weight vinyl halide polymers which are easily molded and extruded under conventional conditions. It also makes it possible to obtain vinyl halide polymers ranging from soft and waxy to hard and resilient solids.

This application is a continuation-in-part of co-pending application Serial No. 128,503 filed November 19, 1949, now abandoned.

It is obvious that many variations may be made in the processes and products of this invention without departing from the spirit and scope thereof as defined in the appended claims.

What is claimed is:

1. A mass polymerization process which comprises polymerization a vinyl halide at from 100° C. to 400° C. and at 25 to 500 atmospheres pressure in contact with a mixture of molecular equivalent amounts of adipoyl peroxide and hexamethylene diamine.

2. A process as in claim 1 wherein the vinyl halide is vinyl chloride.

3. A mass polymerization process which comprises polymerizing 100 parts of a vinyl halide at from 100° C. to 400° C. and at 25 to 500 atmospheres pressure in contact with from 0.01 to 5 parts of a mixture of molecular equivalent amounts of adipoyl peroxide and hexamethylene diamine.

4. A mass polymerization process which comprises polymerizing 100 parts of vinyl halide at from 100° C. to 400° C. and at 25 to 500 atmospheres pressure in contact with from 0.01 to 1.0 part of a mixture of molecular equivalent amounts of adipoyl peroxide and hexamethylene diamine.

5. A mass polymerization process which comprises polymerizing 100 parts of vinyl chloride at 300° C. and 250 atmospheres pressure in contact with 0.1 part of a mixture of molecular equivalent amounts of adipoyl peroxide and hexamethylene diamine.

HAROLD F. PARK.

No references cited.